S. BURROWS.
Rice and Clover Huller.

No. 28,151.

Patented May 8, 1860.

WITNESSES
D. B. Peck
L. C. Smith

INVENTOR
Stephen Burrows

UNITED STATES PATENT OFFICE.

STEPHEN BURROWS, OF WHITEWATER, WISCONSIN.

RICE AND CLOVER HULLER.

Specification of Letters Patent No. 28,151, dated May 8, 1860.

*To all whom it may concern:*

Be it known that I, STEPHEN BURROWS, of Whitewater, in the county of Walworth and State of Wisconsin, have made certain new and useful Improvements in Rice and Clover Hullers; and I do hereby declare that the following is a full, clear, and exact description thereof, reference being had to the accompanying drawings, making a part of this specification, in which—

Figure 1:
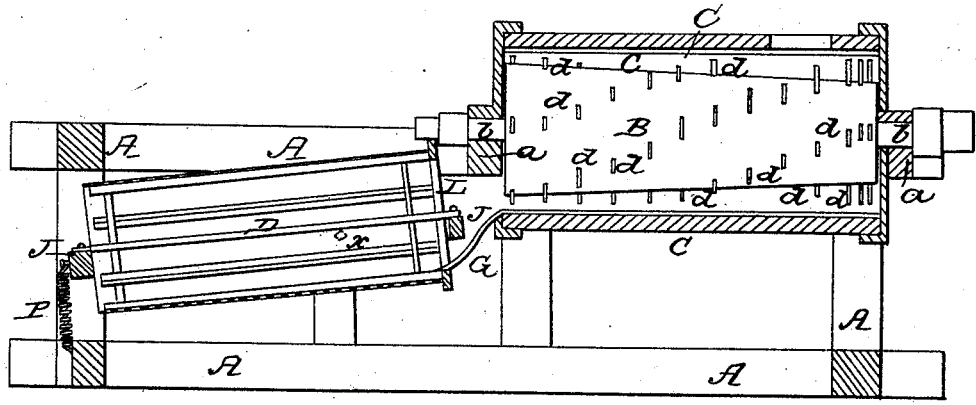
Figure 2:
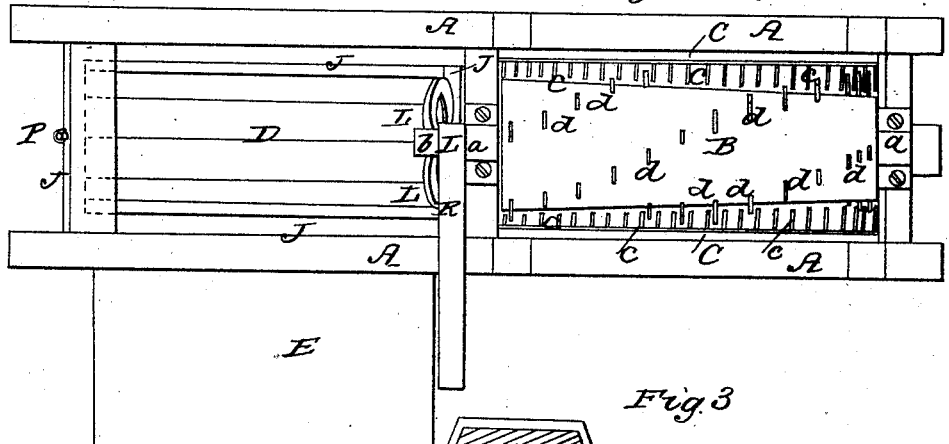
Figure 3:
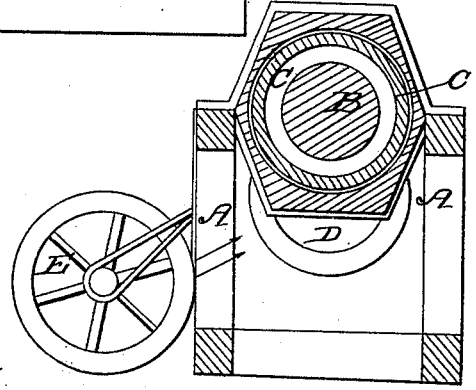

Figure 1, represents a longitudinal vertical section taken through the entire machine. Fig. 2, is a plan view of the machine with the upper portion of the concave removed. Fig. 3, is a vertical transverse section taken through the machine as represented by Fig. 1.

Similar letters of reference indicate corresponding parts in the several figures above referred to.

To enable others to make and use my invention I will proceed to describe its construction and the operation of the several parts.

A, A represents a longitudinal frame upon which is mounted the threshing cylinder B, concave C, rotary bolt D, and fan and cylinder E. The threshing cylinder B, has its bearing in journal boxes $a$, $a$, and may be rotated by any suitable power applied by means of a belt or otherwise to the shaft $b$, this cylinder is made conical or tapering from the discharging end to the end in which the chaff is first received, as clearly shown by Figs. 1, and 2. Surrounding this cylinder B, is the concave C, the surface of which is straight and concentric with the axis of the threshing cylinder and roughened or serrated as is common to those machines now in use. On a horizontal line with the axis of the cylinder are pins $c$, $c$, shown by Fig. 2, the length of which gradually diminishes as the cylinder enlarges between which pins pass the projecting teeth $d$, of cylinder B, which teeth are placed spirally around the cylinder—the spiral decreasing as it approaches the discharging end—and diminish in length from the feed to the discharging end in proportion as the cylinder enlarges; the effect of this arrangement of teeth is to retard the rate at which the chaff approaches the end of the cylinder at which it is discharged while its rotary motion, owing to the increased circumference of the cone at this end, is greatly accelerated while at the same time an equal motion and packing is preserved throughout and the grain more thoroughly and speedily separated from the chaff than by any other arrangement heretofore used.

The grain and chaff after passing through the threshing operation is conveyed by means of a trough G, in to the rotary bolt D, which is hung in a swinging frame J, having its bearings in either end of said frame. The bolt consists of a wire cloth stretched over a frame and open at either end. It receives its rotary motion from the shaft of the threshing cylinder B, by means of a friction wheel L, which is held in contact with a roller upon the thresher shaft by a helical spring P, the frame J, being pivoted at $x$, to the main frame A, A. R, is a band which passes over a pulley on the thresher shaft and around a pulley on the fan shaft, this band R, is crossed so as to give opposite motion to the fan and bolting cylinder. The fan and fan box are arranged along on the outside of frame A, A, and parallel with the bolt so that when the machine is in operation the grain and chaff falling from the bolt receives a constant blast from the fan.

What I claim as my invention and desire to secure by Letters Patent, is—

1. The combination of the revolving inclined bolting cylinder D, supported in the frame J, as described, with the threshing cylinder B, when the said bolting cylinder is driven by the frictional contact of the shaft $b$, the whole being constructed and operating as described.

2. The combination of a concave C, which has parallel sides, pins $c$, $c$, which gradually diminish in length from the receiving to the discharging end of the machine, and the conical cylinder B, having teeth $d$, $d$, of gradually diminishing length placed spirally on its circumference in such manner that the degree of the spirals decreases as the teeth approach the discharging end of the cylinder, substantially as and for the purposes set forth.

STEPHEN BURROWS.

Witnesses:
D. B. PECK,
L. C. SMITH.